United States Patent Office 3,325,446
Patented June 13, 1967

3,325,446
STABILIZED HALOGEN-CONTAINING OLEFIN POLYMER COMPOSITIONS AND STABILIZERS THEREFOR
Leo S. Chang, Madison, Richard B. Lund, Whippany, Arleen C. Pierce, Parsippany, and Edith Turi, Livingston, N.J., assignors to Allied Chemical Corporation, New York, N.Y., a corporation of New York
No Drawing. Filed Apr. 17, 1964, Ser. No. 360,770
9 Claims. (Cl. 260—45.8)

This invention relates to the stabilization of halogen-containing polyolefins against the harmful effects of high temperatures and more particularly to novel chlorinated polyethylene compositions having good thermal stability.

It is known that halogen-containing polyolefins such as polyvinyl chloride, chlorinated polyethylene and chlorinated polypropylene are adversely affected when exposed to elevated temperatures either during fabrication or during use. This adverse effect is usually evidenced by a darkening in color and an increase in viscosity which is demonstrated by the increased work required to extrude or mix the material. It is generally believed that this change in viscosity is due to splitting hydrogen and/or chlorine atoms out of the polymer molecule resulting in increased crosslinking of the polymer.

Many additives have been proposed which increase the thermal stability of specific halogen-containing polyolefins. However, there is no consistency in the effectiveness of these stabilizers when used in different types of halogen-containing polyolefins. For instance, a number of compounds which effectively stabilize vinyl chloride compounds against thermal effects, have little or no stabilizing effect on chlorinated polyethylene. Another factor to be considered in the selection of a stabilizer against thermal effects is the presence of a metal constituent in many of the prior art additives. These metal-containing stabilizers, such as metal salts, metal phenolates and organo-metallic compounds are frequently incompatible with the polymer causing loss of transparency, discoloration and non-homogeneous appearance.

It is an object of the present invention to provide heat stable chlorinated polyethylene compositions.

Another object of the present invention is to provide metal-free organic stabilizers for chlorinated polyethylene.

A further object of the present invention is to provide thermally stabilized chlorinated polyethylene compositions having good color characteristics.

Additional objects and advantages of the present invention will become apparent from the following detailed description thereof.

In accordance with the present invention the thermal stability of chlorinated polyethylene is improved by the addition thereto of at least one nitrogen-containing heterocyclic compound selected from the following group:

4,8-dichloro-2,6-dibenzylbenzo[1-2,4-5]bisoxazole:

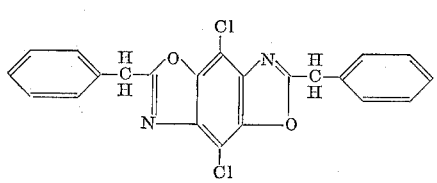

4,8-dichloro-2,6-diethylbenzo[1-2,4-5]bisoxazole:

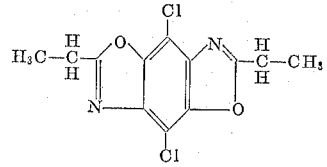

poly(4,8-dichloro-2,(6)-ethylenebenzo[1-2,4-5]bisoxazole):

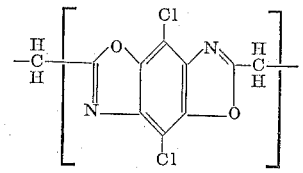

3,5-diphenyl-1,2,4-oxadiazole:

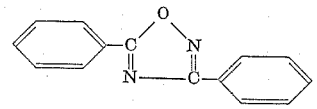

1,2-bis(2-benzimidazolyl)ethylene:

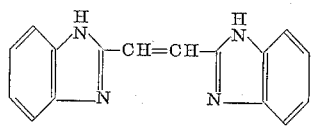

1,4-bis-(2-benzimidazolyl)benzene:

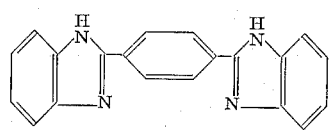

2-phenylbenzothiazole:

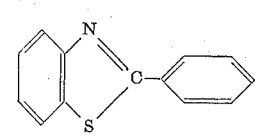

2,3-diphenylquinoxaline:

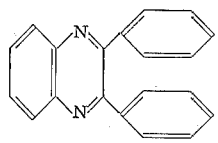

2,3-bis-(p-hydroxyphenyl)quinoxaline:

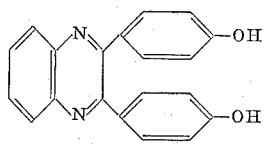

Maleanil: (N-phenylmaleimide):

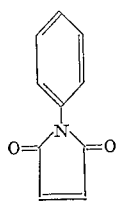

These stabilizers are effective when added to chlorinated polyethylene in amounts equal to at least about 0.5 percent by weight of the polymer, with optimum results being obtained when the stabilizers are added in amounts equal to about 1 to 10 percent by weight of the polymer. All of the stabilizers are known compounds except for 4,8-dichloro-2,6-dibenzylbenzo[1-2,4-5]bisoxazole; 4,8 - dichloro - 2,6-diethylbenzo[1-2,4-5]bisoxazole; and poly(4,8-dichloro-2, (6)-ethylenebenzo[1-2,4-5]bisoxazole), which novel compounds are disclosed in greater detail in a copending application entitled Benzoxazole Compounds, Serial No. 360,745, issued as U.S. Patent 3,268,545 on August 23, 1966, and filed concurrently herewith. The ability of the additives of this invention to thermally stabilize chlorinated polyethylene does not appear to be the result of any mechanism which is presently understood and other nitrogen-containing heterogeneous compounds having formulas similar to those of the present additives have been found to possess little or no stabilizing ability.

The stabilizers can be employed with other common additives used in halogenated polyolefin formulations, such as stabilizers against the effects of radiation, fillers, pigments, and dyes. The stabilizer can be incorporated into the polymer formulation by any known blending technique.

The effectiveness of these stabilizers can be measured by determination of the extent of crosslinking which is occasioned in the polymer by exposure to elevated temperatures. This crosslinking can be measured by the amount of gel formation. The latter can be determined as the percentage of the polymer, originally entirely soluble in monochlorobenzene, which is no longer soluble after the heat treatment. Gel formation increases viscosity and slows the rate of extrusion of the polymer if extrusion is carried out at a constant pressure on the polymer.

A further measure of effectiveness of stabilization is the comparison of color of the unstabilized material with that of the stabilized material after both have been exposed to elevated temperatures.

The chlorinated polyethylene stabilized by our invention can contain from about 20 to about 80% by weight chlorine. In a preferred embodiment, the chlorinated polyethylene is randomly chlorinated whereby it is essentially amorphous and has a low brittle point (glass transition temperature), such as about 0° C. or lower at 20 percent chlorine content and rising with chlorine content to over 185° C. at 80 percent chlorine content. Particularly suitable polyethylenes to be chlorinated for use in our invention are those produced as described in Example 6 of British Patent No. 858,674, of January 11, 1961, to Allied Chemical Corporation. Such polyethylenes can be chlorinated with advantage for use in our invention by the process described in Example 3 of French Patent No. 1,316,044 of December 17, 1962, to Allied Chemical Corporation.

The polymerization process of British Patent No. 858,674 results generally in a polymer of high molecular weight such as 500,000 to 5,000,000 average molecular weight, and of density of about 0.935 to 0.96 gm./cm.³ at 25° C. The molecular weight of the polymer can be reduced by a thermal treatment, for instance in accordance with the process outlined at page 12, lines 73–77 of the above-identified British Patent No. 858,674. The molecular weight of the resulting polyethylenes will be in the range of about 20,000 to 300,000 and the density will be about 0.94–0.985 gm./cm.³ at 25° C.

The foregoing molecular weights are calculated from the intrinsic viscosity of a solution of the polymer in decalin, according to the method of P. S. Francis et al. (31 J. Pol. Sci., 453–466 of September 1958), i.e. by using the following formula:

$$\eta = 6.77 \times 10^{-4} \times M^{0.67}$$

where $\eta$ is the intrinsic viscosity in deciliters per gram, and $M$ is the average molecular weight.

When polyethylenes of molecular weights such as 100,000 and below are chlorinated for use in our invention, solution chlorination methods can be used to advantage to obtain the desired amorphous products.

The glass transition temperatures above cited can be determined by a standard test for stiffness (ASTM test D-1043-51), as the temperature below which the stiffness sharply increases so that the sample becomes brittle. A typical stiffness modulus at the glass transition temperature for the subject chlorinated polyethylenes is $1.45 \times 10^4$ p.s.i. (i.e. $10^9$ dynes/cm.²).

One preferred group of randomly chlorinated polyethylenes of chlorine content in the range 20–80 percent by weight used in our invention, will have relatively high intrinsic viscosities from about 1.5 to about 5 deciliters per gram, indicating high molecular weight. Other useful and preferred chlorinated polyethylenes, not necessarily amorphous, will have intrinsic viscosities from about 0.1 to about 1.5 deciliters per gram, indicating lower molecular weight of the polymer. These intrinsic viscosities are determined upon a 0.1 gram per 100 ml. solution in dichlorobenzene at 100° C.

The following examples describe completely specific embodiments of our invention and illustrate the best mode contemplated by us of carrying out our invention; but are not to be interpreted as limiting the invention to all details of the examples.

The samples tested consisting of unstabilized controls and compositions containing stabilizer in an amount equal to 4% by weight of the weight of the chlorinated polyethylene.

In all tests the chlorinated polyethylene sample was ground to about −40 mesh powder. The stabilizer was dissolved in a volatile solvent, such as methanol. This solution was added to the powdered polymer and the mixture was stirred under $N_2$ at ambient temperatures, until completely dried.

About 2–3 g. of each prepared sample was heated in open test tubes in a block heater at 200° C. for 60 minutes, except where specified otherwise. This heat treatment of the sample resulted in the thermal breakdown of the polymer into a certain percentage of a crosslinked product, or gel; as well as resulting in a discoloration of the polymer, manifested by darkening. The quantitative value of the discoloration was measured using a reflectance meter with a green filter, by comparing the reflectance of the sample to that of a standard white magnesium oxide sample. The reflectance reading obtained on the discolored sample was then expressed as "percent whiteness," the reflectance of the standard being taken as 100% whiteness.

The amount of crosslinked product or gel formed as a result of the heat treatment was determined in accordance with the following procedure:

About 0.2 to 0.3 g. of the heat treated polymer was weighed into a tared stainless steel basket made of 250 mesh screen. This basket was placed into a Soxhlet extractor containing approximately 125 ml. monochlorobenzene, and refluxed for six hours. The non-crosslinked product was extracted, permitting gravimetric determination of the crosslinked gel. During the extraction the system was kept under slow $N_2$ stream to prevent oxidation.

EXAMPLES 1–12

Table I summarizes the data of Examples 1–8, wherein a 60.1 percent by weight chlorine-containing high molecular weight chlorinated polyethylene was used, produced in accordance with Example 6 of British Patent No. 858,674 above cited for the polyethylene, and Example 3 of French Patent No. 1,316,044 above cited for the chlorination, having an intrinsic viscosity of 4.2, and a glass transition temperature of 73° C. In Control A the data of the unstabilized resin, as well as in Controls B–E data obtained on compounds similar to the compounds found to be effective stabilizers, are given for purposes of comparison.

TABLE I

| Test | Stabilizer | Percent Whiteness | Percent Gel |
|---|---|---|---|
| Control A | Unstabilized resin | 12 | 34 |
| Example 1 | 4,8-dichloro-2,6-dibenzylbenzo-[1-2,4-5] bisoxazole. | 22 | 1 |
| Example 2 | 4,8-dichloro-2,6-diethylbenzo-[1-2,4-5] bisoxazole. | 22 | 2 |
| Example 3 | Poly(4,8-dichloro-2,(6)-ethylenebenzo- [1-2,4-5] bisoxazole). | 18 | 4 |
| Example 4 | 3,5-diphenyl-1,2,4-oxadiazole | 16 | <5 |
| Example 5 | 1,2-bis-(2-benzimidazolyl)ethylene | 17 | 5 |
| Example 6 | 1,4-bis-(2-benzimidazolyl)benzene | 31 | 4 |
| Example 7 | 2-phenylbenzothiazole | 22 | 3 |
| Example 8 | 2,3-diphenylquinoxaline | 15 | 3 |
| Control B | 5-methyloxazolidone-2 | 1 | 80 |
| Control C | 1,2-bis-(5-methyl-2-benzimidazolyl) ethane. | 5 | 49 |
| Control D | Phenothiazine | 4 | 42 |
| Control E | 2-benzylbenzimidazole | 3 | 45 |

In Table II the data of Examples 9–11 are summarized, wherein the resin used was a 67.3 percent by weight chlorine-containing chlorinated polyethylene having an essentially random chlorine substitution, a glass transition temperature of about 150° C., and an intrinsic viscosity of 0.7. In Control F the data of the unstabilized resin as well as in Control G data obtained on a compound similar to the compounds found to be effective stabilizers, are given for purposes of comparison. The samples were heat treated at 230° C. for 30 minutes.

TABLE II

| Test | Stabilizer | Percent Whiteness | Percent Gel |
|---|---|---|---|
| Control F | Unstabilized resin | 4 | 16 |
| Example 9 | Maleanil | 8 | 1 |
| Example 10 | 2,3-bis-(p-hydroxyphenyl) quinoxaline. | 8 | 5 |
| Example 11 | 4,8-dichloro-2,6-dibenzylbenzo [1-2,4-5] bisoxazole. | 6 | 2 |
| Control G | 2,3-dimethylquinoxaline | 1 | 64 |

In Table III information relating to Example 12 is shown, wherein a 30 percent by weight chlorine-containing, reduced molecular weight chlorinated polyethylene, having an intrinsic viscosity of 1.0 was used. The glass transition temperature of the polymer used was about −18° C. In Control H the data of the unstabilized resin are given for purposes of comparison. The samples were heat treated at 150° C. for 60 minutes.

TABLE III

| Test | Stabilizer | Percent Whiteness |
|---|---|---|
| Control H | Unstabilized resin | 17 |
| Example 12 | 1,4-bis-(2-benzimidazolyl)-benzene | 37 |

We claim:
1. A composition comprising a chlorinated polyethylene, and a stabilizing amount of a nitrogen-containing heterocyclic member of the group consisting of 4,8-dichloro-2,6-dibenzylbenzo[1-2,4-5]bisoxazole; 4,8-dichloro-2,6-diethylbenzo[1-2,4-5]bisoxazole; poly-(4,8 - dichloro-2,(6) - ethylenebenzo[1-2,4-5]bisoxazole); 3,5 - diphenyl-1,2,4-oxadiazole; 1,2-bis-(2-benzimidazolyl)ethylene; 1,4-bis-(2 - benzimidazolyl)-benzene; 2-phenylbenzothiazole; 2,3-diphenylquinoxaline; 2,3-bis-(p-hydroxyphenyl)quinoxaline; and maleanil.

2. The composition of claim 1, wherein the concentration of said heterocyclic compound is 1 to 10% by weight, based on said chlorinated polyethylene.

3. The composition of claim 2, wherein said chlorinated polyethylene is a polymer having an intrinsic viscosity in the range between 0.1 and 1.5 deciliters per gram, and a chlorine content between 20 and 80 percent by weight.

4. The composition of claim 2, wherein said chlorinated polyethylene is a high molecular weight polymer with random chlorination, having an intrinsic viscosity in the range between 1.5 and 5 deciliters per gram, and a low glass transition temperature in the range below 0° C. for a polymer of a 20% chlorine content and rising up to about 150° C. for a polymer of a 70% chlorine content, said polymer having a chlorine content between 20 and 70 percent by weight.

5. A composition comprising chlorinated polyethylene, and a stabilizing amount of 4,8-dichloro-2,6-dibenzylbenzo[1-2,4-5]bisoxazole.

6. A composition comprising chlorinated polyethylene, and a stabilizing amount of 4,8-dichloro-2,6-diethylbenzo[1-2,4-5]bisoxazole.

7. A composition comprising chlorinated polyethylene, and a stabilizing amount of poly-(4,8-dichloro-2,(6)-ethylenebenzo[1-2,4-5]bisoxazole).

8. A composition comprising chlorinated polyethylene, and a stabilizing amount of 1,2-bis-(2-benzimidazolyl)-ethylene.

9. A composition comprising chlorinated polyethylene, and a stabilizing amount of maleanil.

References Cited

UNITED STATES PATENTS

| 3,049,509 | 8/1962 | Hardy et al. | 260—45.8 |
| 3,112,291 | 11/1963 | Anderson | 260—45.8 |
| 3,205,083 | 9/1965 | Green | 260—45.8 |

FOREIGN PATENTS 675,431  12/1963  Canada.

DONALD E. CZAJA, *Primary Examiner.*

LEON J. BERCOVITZ, M. J. WELSH,
*Assistant Examiners.*